United States Patent
Ledru et al.

(10) Patent No.: US 9,386,403 B2
(45) Date of Patent: Jul. 5, 2016

(54) SELECTION PROCESS FOR AN APPLICATION IN A TERMINAL USING LOCAL INFORMATION OBTAINED FROM A SECURE MODULE

(71) Applicant: OBERTHUR TECHNOLOGIES, Levallois-Perret (FR)

(72) Inventors: Philippe Ledru, Nanterre (FR); Arnaud Danree, Nanterre (FR)

(73) Assignee: OBERTHUR TECHNOLOGIES, Levallois-Perret (FR)

(*) Notice: Subject to any disclaimer, the term of this patent is extended or adjusted under 35 U.S.C. 154(b) by 0 days.

(21) Appl. No.: 13/681,128

(22) Filed: Nov. 19, 2012

(65) Prior Publication Data

US 2013/0130713 A1 May 23, 2013

(30) Foreign Application Priority Data

Nov. 17, 2011 (FR) .................................. 11 60472

(51) Int. Cl.
*H04W 4/02* (2009.01)
*G06Q 20/32* (2012.01)
*G06Q 20/34* (2012.01)
*G06Q 20/38* (2012.01)
*H04W 4/00* (2009.01)
*H04M 1/725* (2006.01)

(52) U.S. Cl.
CPC ............ *H04W 4/02* (2013.01); *G06Q 20/3224* (2013.01); *G06Q 20/3227* (2013.01); *G06Q 20/3229* (2013.01); *G06Q 20/3278* (2013.01); *G06Q 20/341* (2013.01); *G06Q 20/352* (2013.01); *G06Q 20/3574* (2013.01); *G06Q 20/38* (2013.01); *H04W 4/001* (2013.01); *H04M 1/7253* (2013.01); *H04M 1/72572* (2013.01); *H04M 2250/04* (2013.01); *H04W 4/003* (2013.01); *H04W 4/008* (2013.01)

(58) Field of Classification Search
CPC ....... H04W 4/001; H04W 4/02; H04W 4/025; H04W 4/003; H04W 4/008; H04M 1/72563; H04M 1/72572; H04M 2250/04; G06Q 20/3224; G06Q 20/3227; G06Q 20/3229; G06Q 20/3278; G06Q 20/341; G06Q 20/352; G06Q 20/3574; G06Q 20/38
USPC .............. 455/41.2, 41.3, 414.1, 414.2, 456.1, 455/456.3, 456.6; 705/14.64, 16.17, 41, 64, 705/73
See application file for complete search history.

(56) References Cited

U.S. PATENT DOCUMENTS

| | | | |
|---|---|---|---|
| 8,966,034 B1 * | 2/2015 | Paczkowski et al. | 709/223 |
| 2008/0194296 A1 * | 8/2008 | Roundtree | 455/558 |
| 2009/0037326 A1 * | 2/2009 | Chitti et al. | 705/39 |
| 2009/0149195 A1 * | 6/2009 | Zhu | 455/456.1 |
| 2009/0248644 A1 * | 10/2009 | Fu et al. | 707/3 |

(Continued)

FOREIGN PATENT DOCUMENTS

| | | |
|---|---|---|
| FR | 2 945 141 A1 | 11/2010 |
| WO | WO 2006/095212 A1 | 9/2006 |
| WO | WO 2011/127084 A2 | 10/2011 |

*Primary Examiner* — Christopher M Brandt
(74) *Attorney, Agent, or Firm* — Arent Fox LLP

(57) ABSTRACT

The process according to various aspects can be executed by a terminal for selecting an application executable at least in part by a secure module incorporated into the terminal, and may include a step for obtaining location information of the terminal, from a memory of the secure module, and a selection step of an application from the obtained location information.

16 Claims, 3 Drawing Sheets

(56) References Cited

U.S. PATENT DOCUMENTS

Figure 1:
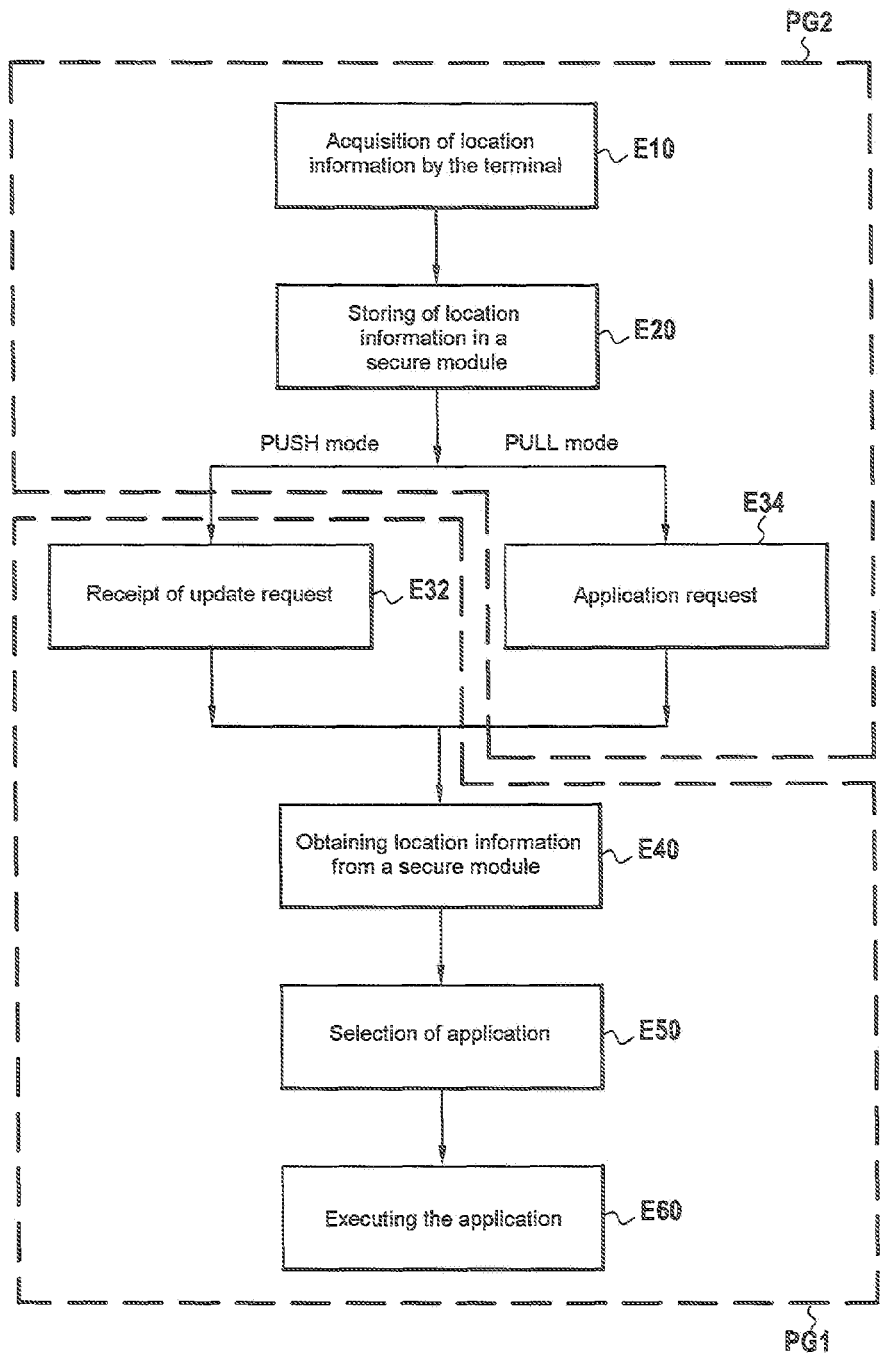

2010/0061308 A1* 3/2010 Becker et al. ............... 370/328
2010/0093355 A1* 4/2010 Voyer et al. ................ 455/436
2011/0099613 A1* 4/2011 Koraichi et al. ............. 726/6
2012/0264400 A1* 10/2012 Khan et al. ................. 455/411
2013/0017862 A1* 1/2013 Lee et al. ................... 455/558
2013/0045737 A1* 2/2013 Manalo ....................... 455/433

* cited by examiner

SELECTION PROCESS FOR AN APPLICATION IN A TERMINAL USING LOCAL INFORMATION OBTAINED FROM A SECURE MODULE

BACKGROUND OF THE INVENTION

The present invention relates to the field of terminals capable of accommodating a plurality of executable applications.

In general, an executable application is a computer program capable of fulfilling one or more functions when executed by a processor or by a microcontroller of the terminal.

The aim of the invention more particularly is to enable selection of an application amongst a plurality of applications as a function of a localisation context of the terminal.

It applies in particular, though in non-limiting manner, for selecting an application capable of making a transaction with equipment external to the terminal.

By way of example, to illustrate an application of the invention mobile telephones are known today which comprise short-range radiofrequency communication means, for example conforming to the NFC (Near Field Communication) standard having a range of a few centimeters, allowing the terminal to communicate with an external reader, and a secure memory containing one or more payment applications, the payment information necessary for a transaction being communicated to the reader via the above communication means. NFC radiofrequency communications means comprise an antenna and a dedicated microcircuit to ensure security of information transmitted by this interface. The antenna and the microcircuit can be integrated into the mobile telephone or be included in a detachable module such as a SIM card, a sticker fixed to the mobile terminal, or a MMC card (MultiMedia card) for example.

By way of reminder, a bank transaction consists of an exchange of secure data between a payment terminal and a bank application stored in a secure memory according to a defined protocol (e.g. the EMV protocol defined by Europay MastercardVisa Corporation) initiated by an initial exchange between an administration application of applications, tasked with managing the order and priority of payment applications loaded in the memory (e.g. the PPSE application of the EMV standard), and the payment terminal.

When the mobile telephone comprises several payment applications, the problem of automatic selection of the application as a function of the localisation context arises since the aim is to prevent the user from selecting the payment application manually.

The prior art discloses document US 2009/037326 which describes a mobile telephone capable of selecting a bank application as a function of location information supplied to the telephone by an external device, for example, by a payment terminal or by localisation means of GPS type.

This method especially has the major disadvantage in that it is necessary for the terminal to comprise a satellite-positioning device and for this device to be operational during each transaction. This can be problematic in the event of non-receipt of the satellite signal, which is currently the case in cities or inside a building such as commercial a centre.

Also, when the payment terminal supplies the location information, the duration of the transaction between the payment application and the payment terminal will be extended. This extra time risks disturbing the user of the application. Also, the location information is dependent on the payment terminal which may or may not be compatible with this technique.

The invention proposes a selection process of an application in a terminal which does not have the disadvantages of the prior art.

AIM AND SUMMARY OF THE INVENTION

The invention concerns a process which can be executed by a terminal for selecting an application executable at least in part by a secure module incorporated in the terminal, among a plurality of applications.

This process comprises:
 a step for obtaining location information of the terminal from a memory of this secure module; and
 a selection step of an application from this location information.

Correlatively the invention concerns a terminal comprising:
 a module for obtaining location information of the terminal from a memory of a secure module incorporated in this terminal; and
 a selection module of an application executable at least in part by this secure module, the selection being made from this location information.

Therefore, and contrary to the prior art, the location information used for selecting the application is obtained from a secure module incorporated in the terminal.

The invention makes the solution autonomous and independent of the infrastructure of the payment terminal or of any external device. The system is updated and ready to be used before the bank transaction is initiated. Also, the selection mechanism is integrated into the secure module and is compatible with any type of mobile terminal. The invention has the advantage of being able to be executed very simply on terminals.

In a preferred embodiment of the invention, the location information is acquired by a module of the terminal external to the secure module (hereinbelow called "acquisition module") and stored in the secure module.

In an embodiment, the terminal is a cell phone and the terminal acquires the location information during a search step of a telecommunications network whereof the coverage zone covers the terminal.

In particular, the location information can be acquired on startup of the terminal, or in a nomadism situation during roaming from a first coverage zone covered by a first telecommunications network to a second coverage zone covered by a second telecommunications network.

Such a nomadism situation with change of geographic zone is known to the person skilled in the art under the English term "roaming".

In particular, in the case of a terminal conforming to LTE standard, a fourth-generation cellular telephony standard, the invention proposes exploiting location information of the terminal obtained by known selection mechanisms of telecommunications networks executed during a coverage search phase by a mobile telephone.

In particular, the specifications ETSI TS 131 102 V10.1.0 (2011-04) of the standard LTE define a file of a local information $EF_{LOCI}$ containing the code country of a telecommunications network whereof the coverage zone covers the terminal.

This file $EF_{LOCI}$ is stored in the SIM card of the telephone (secure module in terms of the invention).

As is known, and as described in the specification 3GPP TS 31.102 version 10.1.0 Release 10 this file comprises a TMSI field and a LAI field.

The TMSI field is pertinent for a given operator; it can contain a "code country" octet for determining a geographic zone.

The LAI (Location Area Identification) code, defined by the document 3GPP TS 23.003 Release 9 22 V9.3.0 (2010-06) comprises two localisation codes, specifically:
 an MCC (Mobile Country Code) code which identifies the country in which the network is located; and
 an LAC (Location Area Code) code which identifies a geographic zone within the network.

Therefore, in this particular embodiment of the invention, the location information, determined during a search phase of a telecommunications network, either on startup of the terminal or in a nomadism situation, is stored in the file $EF_{LOCI}$ of the SIM card and utilised for selecting an application executable by the terminal.

In an embodiment, the terminal interrogates the memory (for example the $EF_{LOCI}$ of file the SIM card), on its own initiative, for example regularly.

In a particular embodiment, the terminal according to the invention is a cellular communications terminal comprising a communications module on a cellular telecommunications network. In this terminal:
 the secure module in terms of the invention is an authentication module of the terminal on said network;
 the communications module comprises means for acquiring the location information and for storing them in the secure module; and
 the selection module in terms of the invention is a PPSE application conforming to standard EMV cited in the preamble of this document.

In another embodiment, the location information is obtained by reading a field which identifies the operator of the telecommunications network in the coverage of which the terminal is located.

In another embodiment, the location information is obtained by reading a field corresponding to a code of the country in which the terminal is located.

In a preferred embodiment of the invention, the step for obtaining location information is performed on receipt of a signalling message sent by the secure module, this message being representative of an update of the memory.

Therefore, in this embodiment, as soon as the memory of the secure module comprises updated location information, a signalling message is sent to the processor of the terminal so that it can select the application automatically as a function of the new localisation.

The STK Refresh command can be use as signalling message, for example.

In a particular mode of the invention, the selected application is a modular application whereof:
 at least one module is executable by a micro-controller of the secure module; and
 at least one module is executable by a micro-controller of the terminal external to the secure module.

In a particular embodiment, the different steps of the selection process are determined by instructions of computer programs.

As a consequence, another aim of the invention is a computer program on a storage medium, this program being likely to be executed by a computer, this program comprising instructions adapted for executing the steps of the selection process such as mentioned hereinabove.

This program can utilise any programming language and be in the form of source code, target code, or intermediate code between source code and target code, such as in a partially compiled form or in any other preferred form.

Another aim of the invention is a storage medium readable by a computer, and comprising instructions of a computer program such as mentioned hereinabove.

The information medium can be any entity or device capable of storing the program. For example, the medium can comprise storage means such as ROM, for example a CD ROM or a microelectronic circuit ROM, or again magnetic recording means, for example a diskette (floppy disc) or a hard drive.

On the other hand, the information medium can be a transmissible medium such as an electric or optic signal, which can be sent via an electric or optic cable, by radio or by other means. The program according to the invention can be downloaded in particular over a network of Internet type.

Alternatively, the information medium can be an integrated circuit in which the program is incorporated, the circuit being adapted for executing or for being utilised in the execution of the process in question.

Another aim of the invention is a secure module comprising a microcircuit and a medium such as mentioned hereinabove.

BRIEF DESCRIPTION OF THE DIAGRAMS

Figure 2A:
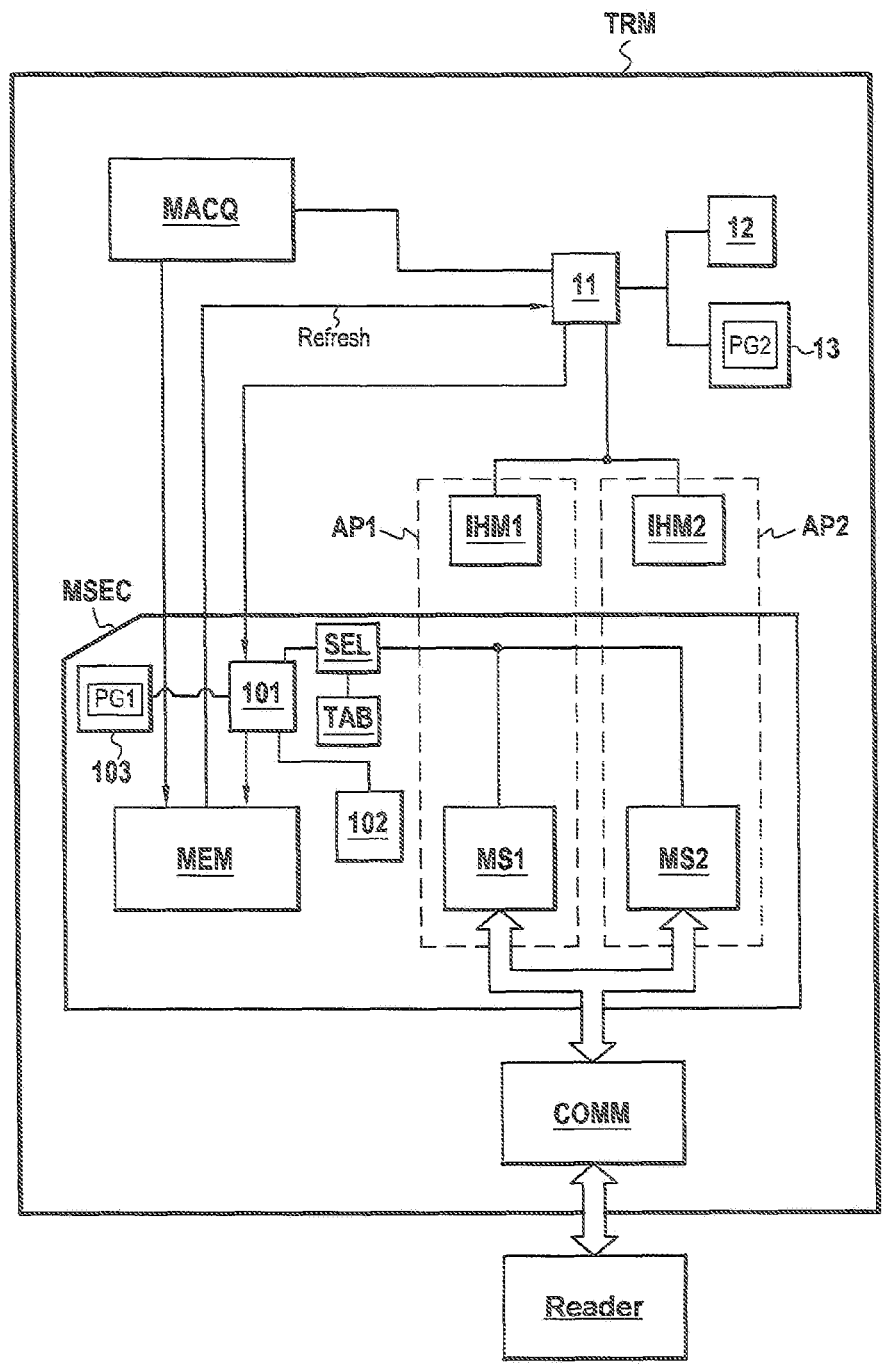
Figure 2B:
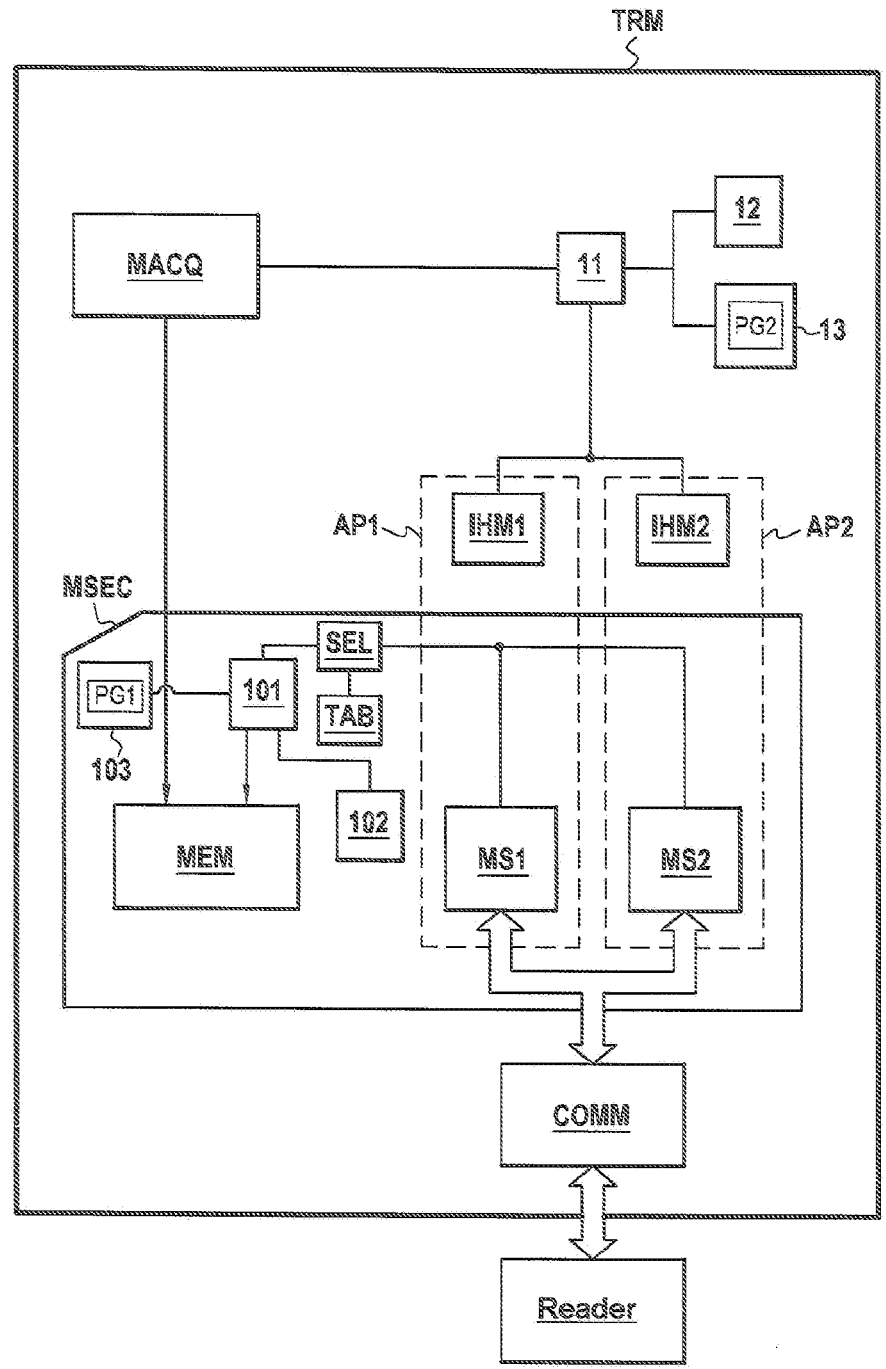

Other characteristics and advantages of the present invention will emerge from the following description in reference to the diagrams which illustrate an embodiment devoid of any limiting character, in which:

FIG. 1 illustrates, in the form of an organigram, the main steps of a selection process in keeping with a particular embodiment of the invention; and FIGS. 2A and 2B schematically illustrate a terminal in keeping with two particular embodiments of the invention.

DETAILED DESCRIPTION OF THE INVENTION

In the embodiment of FIG. 2A, the TRM terminal according to the invention is a cell phone conforming to standard LTE, corresponding to the fourth generation of standard. Over recent years, principal operators have progressively migrated from the GSM/CDMA (2G) standard to the UMTS/EvDo (3G), then more recently to the LTE standard "Long Term Evolution"). In time, LTE technology will become a so-called $4^{th}$-generation standard (in its version 10 called LTE Advanced). The person skilled in the art will understand that a cell phone compatible with any one of the generations of cellular telephony can be used to execute the invention.

The cell phone comprises especially a secure MSEC module constituted by a SIM card. It also comprises especially a processor 11, live memory of RAM 12 type and a read-only memory of ROM 13 type external to the secure MSEC module.

Read-only memory 13 contains a computer program PG2 whereof the instructions enable steps E10, E20 and E34 of the selection process shown in FIG. 1 to be conducted.

The secure MSEC module is in keeping with the invention. It comprises especially a microcircuit 101, live memory of RAM 102 type, and read-only memory of ROM 103 type.

The read-only memory 103 comprises a medium in terms of the invention. It contains a computer program PG1 whereof the instructions conduct steps E32 and E40 to E60 of the selection process shown in FIG. 1.

In the example described here, the TRM terminal comprises two payment applications AP1 and AP2.

Each of these applications is a modular application and comprises a man-machine interface (IHM1, IHM2) constituted by a module executable by the processor 11 and a module (MS1, MS2) incorporated in the secure MSEC module and executable by the microcircuit 101 of the secure module, in cooperation with the live memory 102 of this module.

It is remarkable that the TRM terminal comprises, inside the MSEC security module, a SEL selection module of an AP1, AP2 application from location information obtained from memory MEM integrated into the secure MSEC module.

This MEM memory can be non-volatile.

In the embodiment described here, the SEL module executes the functionalities of a PPSE application in keeping with the EMV standard.

In particular, this SEL module is tasked with managing the order and priority of payment applications loaded in memory. Therefore, it selects the payment application to be used as priority during a payment transaction.

Also, this SEL module is automatically updated during addition of an application of type AP1 or AP2 by an auto-recording method. Each application supplies the SEL module with information allowing it to order these same applications and to present a list to the TRM terminal.

Also remarkable is that the TRM terminal comprises an MACQ acquisition module, external to the secure MSEC module, capable of acquiring the location information and storing it in the MEM memory of the secure MSEC module.

In the embodiment described here, the TRM terminal is a cell phone. It comprises, as is familiar, a communications module capable of communicating over the cellular network and an authentication module of the terminal, constituted for example by a SIM or USIM card.

In the embodiment described here, the communications module on the cellular network implements the acquisition module of location data in terms of the invention. They are therefore combined in FIG. 2A and referenced MACQ.

Similarly, in the embodiment described here, the authentication module (for example a SIM card) implements the secure module in terms of the invention. They are therefore combined in FIG. 2A and referenced MSEC.

In this particular embodiment, the TRM terminal comprises COMM communication means with an external reader LECT. This communications module can conform to the NFC standard.

In the embodiment of FIG. 2A, the secure MSEC module is capable of generating a STK Refresh command for informing processor 11 of any update of MEM memory. On receipt of such a command, the processor 11 sends a command to the processor 101 of the secure module to inform it of the update.

As is known, during startup of the TRM terminal or during a country change, that is in a nomadism situation (roaming), the TRM terminal makes a search of a telecommunications network whereof the coverage covers the terminal (step E10).

When such a network is identified, the TRM terminal makes a registration application with this network and if this application is accepted the code identifying this network is stored in the $EF_{LOCI}$ file (step E20).

These steps E10 and E20 known per se constitute acquisition steps of location information by the terminal and storage of location information in a secure module in terms of a particular embodiment of the invention.

According to the invention, selection of the application in the secure module is done from the location information stored in the secure module. In the embodiment described here, the secure MSEC module detects the update of the memory for selecting the application executed by the secure microcircuit as a function of this update when it receives a command from the processor 11, following REFRESH.

Also, the invention proposes two main variants for selecting an application on the terminal.

In a first variant shown in FIG. 2A (PUSH mode), during a step E32 the secure module sends a signalling message to the processor 11 of the terminal (for example an STK Refresh command) when the MEM memory is updated; on receipt of this message the processor 11 sends a command to the processor 101 of the secure MSEC module which activates the SEL selection module so that it reads the memory of the secure module to obtain the location information during a step E40.

In a second variant, not shown, (PULL mode), obtaining step E40 is conducted on the initiative of the terminal, for example on receipt of a request sent, suing a step E34, by an application for managing bank applications of the terminal, the latter regularly interrogating the processor 101 to find out the selected application and directly activate the selected application at the level of the terminal via the IHM1, IHM2 module.

In any event, according to the invention the secure module and/or the terminal selects, during a step E50, the application or the AP2 application as a function of the AP1 location information read in the secure MEM memory in step E40.

The selection can be made using a TAB correspondence table between a country code and the identifiers of AP1 and AP2 applications. The selection can likewise be made using a correspondence table between an operator identifier of the cellular telecommunications network, for example the operator of the network used by the terminal cellular, and identifiers of the AP1 and AP2 applications.

This application can be run for example during a step E60.

It can also stay asleep, but be given priority.

For example, if the AP1 and AP2 applications are two payment applications, the application selected at step E50 can be activated and kept active until the terminal is turned off or until the next update of the localisation $EF_{LOCI}$ file.

In the embodiment described here, the location information is the MMC code (Mobile Country Code of the field LAI (Location Area Identification)) of the $EF_{LOCI}$ file. Other codes can be used, for example a code identifying the operator of the telecommunications network in the coverage of which the terminal is located.

In another embodiment the location information can be more precise than the LAC code. It can especially comprise the identifier of cell-id cell obtained by the SIM card when interrogating the terminal with the proactive "provide local information" command.

In the embodiment described earlier, the secure module is a SIM card.

In other embodiments the secure module can comprise a card in micro SD MicroSD (Macro Security Digital Card) format or a micro-secure specific controller for example.

With the scope of this invention it is important to specify the following notions. Secure module means a microelectronic component or components executing functions which can be protected by the following protection mechanisms:

Unblocking of a function by authentication using verification of a personal code, that is, the function is executed if the user inputs a personal code.

Protection of data in the memories of the microcircuit by cryptography algorithm respecting the FIPS standard, for example.

Material protection of the microcircuit containing the applications and data. The latter can be protected materially from attacks called non-invasive (attacks by analysis of time, analysis of consumption electromagnetic, analysis), attacks called invasive (clock attack for example) or semi-invasive.

In particular, the secure module in the case of a SIM card is an authentication module of a subscriber to a cellular network conforming to any one of the cellular network standards (2G, 3G, 4G, etc.). The person skilled in the art can select the material specifications adapted to his needs, especially in terms of coverages and bandwidth.

Because of the authentication module the subscriber is authenticated on the communications network by an authentication mechanism based on secret keys and cryptographic algorithms for verifying the identity of the subscriber. The authentication functions on the secure module are preferably also protected by verification by personal code, usually called code PIN. Of course, the person skilled in the art can run other cryptography mechanisms to ensure for example confidentiality and integrity of the data transmitted over the secure connection.

In the preceding example, the AP1 and applications AP2 are applications for executing bank transactions.

It can also relate to an application of any other type, games for example, transport applications or identity application, and it is not essential for the invention that these applications are applications capable of communicating with equipment external to the terminal. More generally, it can be a program run by a microcontroller and comprising a file of lines of code which execute a set of functions, for example NFC payment, IHM interface with user, data communication with environment external to the terminal.

It can also relate to transport applications within the scope of MIFARE technology.

When it is communicating applications, standards other than the NFC standard can be used.

FIG. 2B illustrates another embodiment of the invention in which the processor 101 of the secure module directly informs the selection module MSEL of any update of the location information without passing via the processor 11.

The invention claimed is:

1. A selection process executed by a terminal for selecting an application executable at least in part by a secure module incorporated into that terminal, the selection process comprising:
    obtaining location information of the terminal from a memory of the secure module; and
    selecting an application based on the location information and a mapping table between a country code and an identifier of each of a plurality of applications associated with the terminal,
    wherein the obtaining is conducted on an initiative of the terminal via reading a Temporary Mobile Subscriber Identity (TMSI) or location area identification (LAI) field of a localization file $EF_{LOCI}$.

2. The selection process as claimed in claim 1, further comprising:
    obtaining the location information by an acquisition module of the terminal, external to the secure module; and
    storing the location information in the secure module.

3. The selection process as claimed in claim 2, wherein:
    the terminal is a cell phone; and
    the location information is acquired by the acquisition module during searching of a coverage zone of a telecommunications network, the coverage zone providing a service coverage to the terminal.

4. The selection process as claimed in claim 3, wherein the location information is acquired upon powering up of the terminal, or during roaming from a first coverage zone covered by a first telecommunications network to a second coverage zone covered by a second telecommunications network.

5. The selection process as claimed in claim 1, wherein the location information is obtained by reading a field corresponding to a code of a country in which the terminal is located.

6. The selection process as claimed in claim 1, wherein the location information is obtained by reading a field which identifies an operator of the telecommunications network providing the service coverage to the terminal.

7. The selection process as claimed in claim 2, wherein obtaining the location information is performed by receiving a signalling message sent by the secure module, the signaling message indicating updates of the memory.

8. The selection process as claimed in claim 7, wherein the signalling message comprises a STK REFRESH command.

9. The selection process as claimed in claim 1, wherein the application is a modular application comprising:
    at least one module executable by a microcontroller of the secure module; and
    at least one module is executable by a microcontroller of the terminal that is external to the secure module.

10. A computer program embodied on a non-transitory computer readable medium comprising instructions for executing the selection process as claimed in claim 1 when the computer program is executed by a processor.

11. A non-transitory recording medium readable by a computer on which is recorded a computer program comprising instructions for executing the selection process, as claimed in claim 1.

12. A secure module comprising a microcircuit and a medium, as claimed in claim 11.

13. The selection process of claim 1, wherein the obtaining is carried out regularly.

14. The selection process of claim 1, wherein the obtaining is carried out by an application of the terminal for managing applications.

15. A terminal, comprising:
    a module for obtaining location information of a terminal from a memory of a secure module incorporated in the terminal; and
    a selection module of selecting an application that is executable at least in part by the secure module based on the location information and a mapping table between a country code and an identifier of each of a plurality of applications associated with the terminal,
    wherein the module is configured to perform obtaining the location information on an initiative of the terminal via reading a Temporary Mobile Subscriber Identity (TMSI) or location area identification (LAI) field of a localization file $EF_{LOCI}$.

16. The terminal as claimed in claim 15, wherein the terminal is a cellular communications terminal comprising a communications module on a cellular telecommunications network, wherein:
    the secure module is an authentication module of the terminal on the cellular telecommunications network;
    the communications module comprises means for acquiring the location information and for storing the location information in the secure module; and
    the selection module is a PPSE application.

* * * * *